Jan. 22, 1957    E. J. HERBENAR    2,778,664
PERMANENTLY LUBRICATED RESILIENT CONNECTOR
FOR STEERING LINKAGES
Filed July 6, 1954
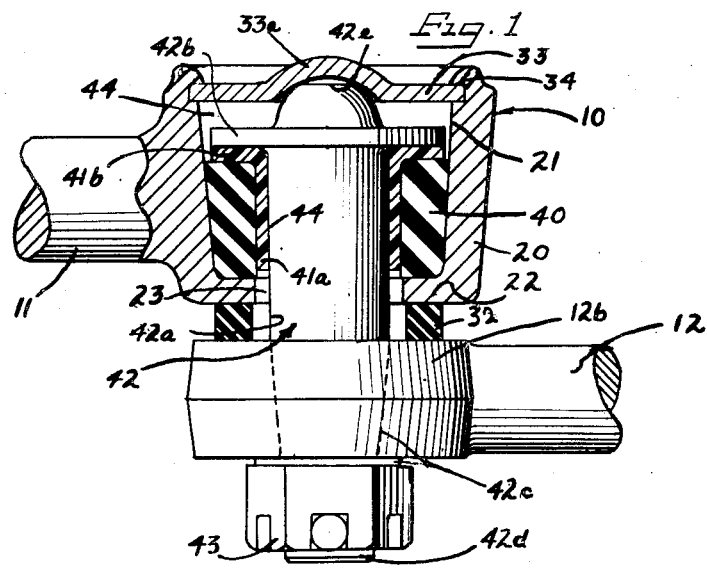
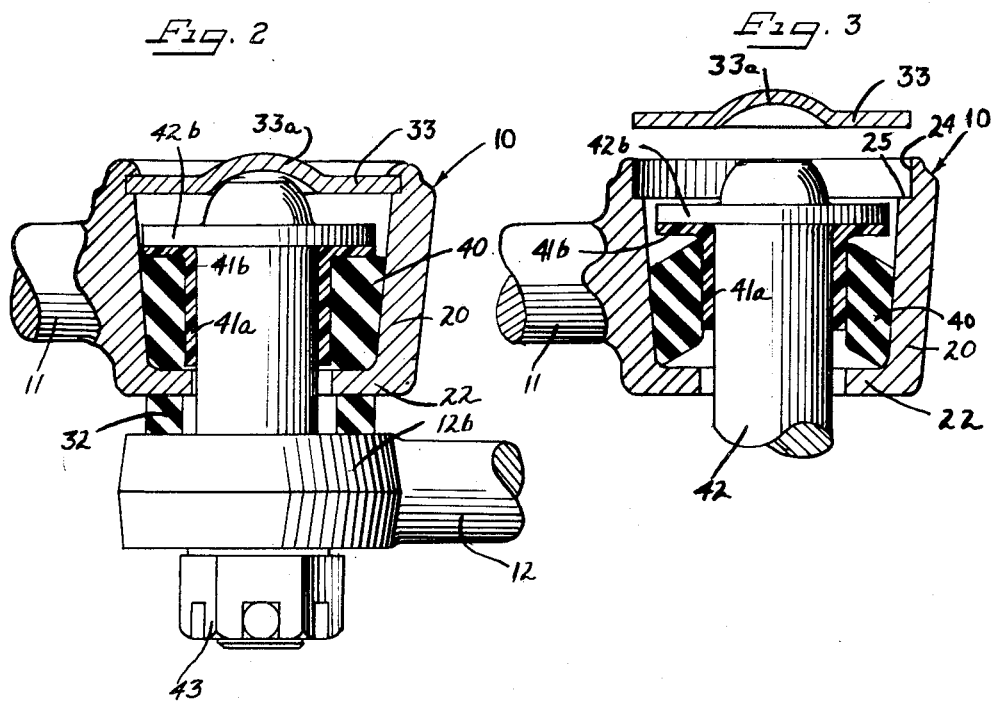
Inventor
Edward J. Herbenar United States Patent Office 2,778,664
Patented Jan. 22, 1957

2,778,664

PERMANENTLY LUBRICATED RESILIENT CONNECTOR FOR STEERING LINKAGES

Edward J. Herbenar, Detroit, Mich., assignor to Thompson Products, Inc., Cleveland, Ohio, a corporation of Ohio Application July 6, 1954, Serial No. 441,541

4 Claims. (Cl. 287—85)

This invention relates to connecting joints especially adapted to provide rotative motion with a limited amount of angular motion without requiring adjustments or lubrication during use.

Specifically, this invention deals with permanently lubricated resilient connecting joints for vehicle steering linkages or the like and having excellent shock dampening characteristics while accommodating relative rotation of the parts together with a limited relative angulation of the parts while remaining efficiently effective in transmitting lateral motion.

The invention will hereinafter be described as embodied in joints for connecting the cross-link with the pitman arm and the idler arm of an automotive steering linkage but it should be understood that the invention is not limited to such particular usage since the principles of the invention are generally applicable to connecting joints where the major function of the joint is to transmit shifting movement while accommodating relative rotation with a limited amount of angular motion.

In accordance with this invention, the ends of a cross-link of an automobile steering linkage have socket housings in which are mounted plastic bearing sleeves backed by solid resilient bushings. Metal studs are rotatably mounted in the sleeves and project from the socket housings to be attached to the pitman arm and idler arm respectively of the linkage. The socket housing is initially packed with lubricant which will last throughout the operating life of the joint. The bushing is preloaded in the socket and is capable of accommodating relative tilting movements of the stud and socket without interfering with the transmission of steering force from the pitman arm to the cross-link. The lateral shifting of the stud and socket parts caused by application of steering force on the linkage, will further load the preloaded bushings to increase the form factor thereof and afford a firm transmitting surface to prevent mushy steering while, at the same time, absorbing shock and deadening wheel noises and the like.

The plastic bearing materials are of the type that do not need to be lubricated for efficient operation and include polymeric amides and polyethylene type high polymers such as nylon, teflon, and the like.

It is then an object of this invention to provide a permanently lubricated resilient connector for vehicle steering linkages which will freely accommodate relative rotation of the parts together with a limited amount of angular displacement of the parts while dampening shock and deadening noise.

A further object of the invention is to provide a vehicle steering linkage having permanently lubricated resilient connectors at the connecting points thereof where the major function is to provide rotative movement with a limited amount of angular motion.

A still further object of the invention is to provide a stud and socket joint having plastic bearings rotatably supporting the stud in the socket and possessing a low coefficient of friction and an ability to operate without lubrication together with synthetic oil-resistant rubber compounds supporting the bearings to absorb shock, deaden noise, and accommodate limited angular displacement of the socket and stud without interfering with efficient transmission of steering movements between the parts.

Another object of the invention is to provide a joint for a steering linkage which will firmly transmit steering movements while accommodating rotation and limited tilting and, at the same time, absorbing noise and dampening shock.

A still further object of this invention is to provide a rubber bushed plastic bearing support for a joint stud which will progressively resist deformation upon application of lateral forces on the stud supported by the bearing.

Other and further objects of the invention will be apparent to those skilled in the art from the following detailed description of the annexed sheets of drawings which, by way of preferred examples only, illustrate several embodiments of the invention.

On the drawings:

Figure 1 is a cross-sectional view, in elevation, of a joint constructed in accordance with the principles of the present invention;

Figure 2 is a cross-sectional view, in elevation, of the joint illustrated in Figure 1, with the parts laterally shifted in the manner occurring during the transmission of lateral forces; and Figure 3 is an exploded view illustrating the assembly of the joint of Figures 1 and 2.

As shown on the drawings:

The joints 10 of this invention are illustrated in Figure 1 as connecting pivoted parts such as the cross-link 11 of a vehicle steering linkage with the pitman arm 12 of the linkage. The joint 10 accommodates swinging of the pitman arm about its fixed axis by relative rotation of the joint parts and also accommodates limited angular relative motion between the cross-link and the arm. In addition, the joint 10 at the pitman arm 12, must efficiently convert the swinging movement of the stud into lateral shifting of the cross-link 11 for steering. A firm transmission of this motion is necessary in a steering system or the like to prevent mushy steering.

As shown in Figures 1 through 3, the joint 10 includes a cup-shaped socket housing 20 on the end of the cross-link 11. The housing 20 has a tapered bore 21 extending from the open top thereof to an apertured bottom wall 22 having an aperture 23 through the center thereof. The open top of the housing is counterbored at 24 to provide a radial shoulder 25 inwardly from the end of the housing.

A closure disk or plug 33 composed of stamped metal or the like, is seated in the counterbore 24 on the shoulder 25 and is locked in the housing by spinning a portion of the housing over the periphery of the disk as shown at 34.

As shown in Figure 1, the tapered bore 21 of the housing receives an oil-resistant rubber ring 40 against the bottom wall 22 thereof and this ring extends above the middle of the bore. A bearing 41 of plastic material having a low coefficient of friction even when dry, has a tubular portion 41a lining the bore of the ring 40 and an outturned flat flange 41b overlying the ring in the housing. A stud 42 has a cylindrical body 42a rotatably mounted in the tubular portion 41a of the bearing and has a flat collar or flange 42b overlying the flange 41b of the bearing to ride thereon.

The cylindrical body 42a projects freely through the aperture 23 in the bottom of the housing and has a tapered portion 42c seated in the eye end 12b of the pitman arm with the threaded end 42d receiving a nut 43 to urge the eye end into wedging engagement with the tapered portion.

The stud has a fragmental spherical top end 42e seated in the domed or rounded portion 33a of the closure disk 33. A space 44 is provided between the head or collar 42b of the stud and the closure disk to receive lubricant at the time of assembling the parts. As illustrated in Figure 3, the free unloaded state of the rubber ring 40 is different in contour from the loaded shape shown in Figure 1. When the closure cap 33 is forced down on the rounded top 42e of the stud, the ring 40 is thereby loaded and in attempting to reclaim its unloaded contour, it will hold the rounded end 42e of the stud in good bearing relation with the dome 33a of the closure cap. At the same time, the flange 41b of the bearing, will be urged against the head or collar 42b of the stud to maintain these parts in good bearing relationship. An automatic wear take-up assembly is thereby provided.

As illustrated in Figure 2, when lateral steering movements effect lateral shifting of the stud in the housing, the rounded end of the stud will ride down the incline of the dome 33a to further load the rubber ring 40 and thereby increase the form factor of the ring. This axial shifting of the stud 42 simultaneously with the lateral shifting greatly accelerates the resistance to deformation of the rubber ring and quickly "stiffens" the assembly to preclude mushy force transmission and hence mushy steering reactions.

The joint 10', like the joint 10, accommodates free relative rotation of the stud and the housing together with limited angular displacement of these parts. The angular displacement, however, does not interfere with the free rotation since the bearing 41 is substantially stiffer than the rubber ring 40 and accordingly will not be deformed or crushed even though the rubber ring is deformed.

From the above descriptions it will, therefore, be understood that this invention provides a resilient connector accommodating relative rotation of the connected parts throughout a limited range of angular movement while absorbing noise, dampening shock and firmly transmitting lateral movements.

It will be understood that variations and modifications may be effected without departing from the scope of the novel concepts of this invention.

I claim as my invention:

1. A permanently lubricated resilient connector adapted for vehicle steering linkages which comprises a cup-shaped housing having a tapered bore terminating at its reduced diameter end in an end wall provided with an aperture, a solid elastomeric bushing ring seated in said bore against said end wall, a bearing having a low coefficient of friction carried by said ring and having a cylindrical portion lining the bore of the ring and having an outturned flange portion overlying the major portion of the top of the ring, a stud rotatably mounted in the cylindrical portion of the bearing and having an outturned shoulder overlying the flange of the bearing and in rotatable relation therewith, said aperture being slightly larger in diameter than said stud whereby said stud may shift laterally within said aperture, said stud and the cylindrical portion of said bearing cooperating with said end wall to substantially confine said rubber bushing against movement through said aperture, a closure cap for the open top of the tapered bore in the housing, and means positioning said closure cap to exert an axial thrust load on said stud to urge the shoulder thereof against the flange of the bearing, and cooperating surfaces on said stud and said closure cap forcing said outturned shoulder to move axially towards said aperture upon lateral shifting of said stud, said elastomeric ring deforming under such axial shifting of the stud to increase the form factor of the ring to sharply increase resistance to further lateral shifting of said stud without interfering with the free rotation of the stud.

2. A permanently lubricated resilient connector constructed in accordance with claim 1 wherein said bearing comprises a self lubricating plastic.

3. A joint assembly adapted for vehicle steering linkage or the like which comprises a housing having a tapered bore extending with gradually reducing diameter from an open end of the housing to an inturned end wall provided with an aperture, a resilient elastomeric bushing ring snugly seated in said bore on said end wall and having an aperture therethrough aligned with the aperture in said end wall, an anti-friction bearing liner having a cylindrical portion snugly seated in the aperture of said bushing ring and having a radially outturned flange overlying a major portion of the end wall of the bushing ring remote from the end wall of the housing, a stud having a shank rotatably mounted in the cylindrical portion of the bearing liner and having a radially projecting shoulder overlying the flange of the bearing liner, said aperture being slightly larger in diameter than said stud whereby said stud may shift laterally to a small extent within said aperture, said stud shank and bearing liner cooperating with said end wall to substantially confine said bushing ring against movement through said aperture, said stud having a rounded end portion on the side of said freely projecting shoulder opposite from said bushing ring, a closure cap for the open end of said tapered bore and having a domed central portion receiving the rounded end portion of the stud, means positioning said closure cap to load said bushing ring axially of said bore to maintain the rounded end of the stud in contact with the cap, said rounded end and said domed central portion cooperating upon lateral movement of said stud relative to said aperture to shift said stud axially of said bore as the rounded end of the stud climbs the domed portion of the closure cap to thereby compress the substantially confined bushing ring between said outturned flange and said end wall during lateral shifting of the stud to thereby substantially increase resistance to further lateral shifting thereof.

4. A resilient steering connector constructed in accordance with the provisions of claim 3 wherein said bearing liner is constructed of a self lubricating plastic.

References Cited in the file of this patent

UNITED STATES PATENTS

| | | |
|---|---|---|
| 1,859,777 | Keys et al. | May 24, 1932 |
| 2,461,626 | Booth | Feb. 15, 1949 |
| 2,464,982 | Leighton | Mar. 22, 1949 |
| 2,488,979 | Kogstrom | Nov. 22, 1949 |

FOREIGN PATENTS

| | | |
|---|---|---|
| 634,345 | Germany | Aug. 25, 1936 |